Feb. 26, 1957 G. C. BREIDERT 2,782,705
GRAIN STORAGE STRUCTURE AND METHOD
Filed April 14, 1952 3 Sheets-Sheet 2

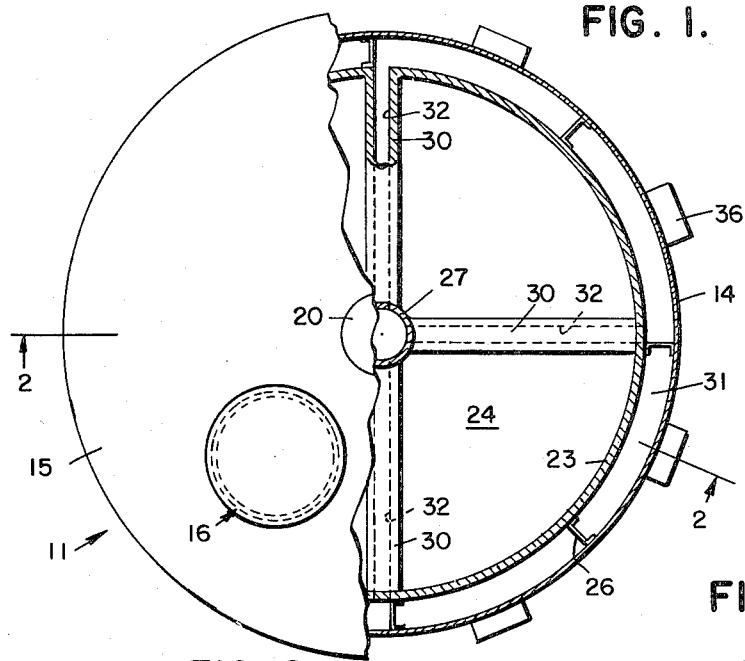
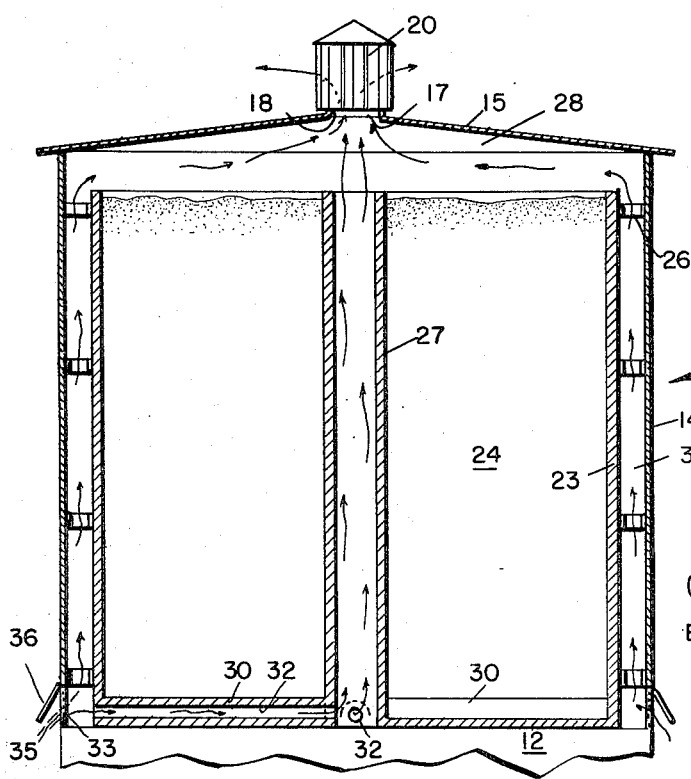
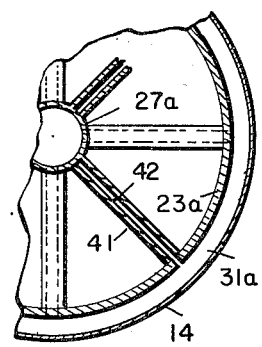

INVENTOR
GEORGE C. BREIDERT
BY
Mason & Graham
ATTORNEYS

Feb. 26, 1957 G. C. BREIDERT 2,782,705
GRAIN STORAGE STRUCTURE AND METHOD
Filed April 14, 1952 3 Sheets-Sheet 3

INVENTOR
GEORGE C. BREIDERT
BY

ATTORNEYS

United States Patent Office 2,782,705
Patented Feb. 26, 1957

2,782,705

GRAIN STORAGE STRUCTURE AND METHOD

George C. Breidert, La Canada, Calif., assignor to The G. C. Breidert Co., a corporation of California Application April 14, 1952, Serial No. 282,141

4 Claims. (Cl. 98—55)

This invention has to do with the storage of grain, granular products, and other substances which are subject to spoilage or deterioration if stored under damp conditions.

The storage of grain for long periods presents a serious problem, since the grain will mildew, rot, or otherwise spoil unless it is kept relatively dry. Various attempts have been made to provide means for ventilating storage structures, but so far as I know, these have not been generally successful. While it has been recognized that forced air ventilation of storage structures can be accomplished, the costly equipment and costly maintenance required makes this prohibitive economically. Furthermore, ventilation alone will not accomplish the desired results. It therefore is an object of my invention to provide a simple, inexpensive, economical method and apparatus for storing grain and other substances and protecting the stored material from spoilage or deleterious effects due to moisture.

More particularly it is an object to provide a method and apparatus in which a grain storage structure functions to draw moisture from the stored grain and circulating air is employed to carry it away. In this connection it is an object to provide means for creating circulation of air through certain parts of a storage structure and means for causing the moisture in the stored material to move toward given regions where the moisture can be carried away by the circulating air.

Another object of the invention is to provide a grain storage structure having air passage means therethrough together with means for substantially continuously causing a flow of air through the passages.

These and other objects will be apparent from the drawings and the following description.

Referring to the drawings:

Fig. 1 is a plan view, broken away with parts in section, showing one form of storage structure;

Fig. 2 is a sectional view on line 2—2 of Fig. 1;

Fig. 3 is a partial sectional plan view showing a modification of the structure of Figs. 1 and 2;

Figure 4:
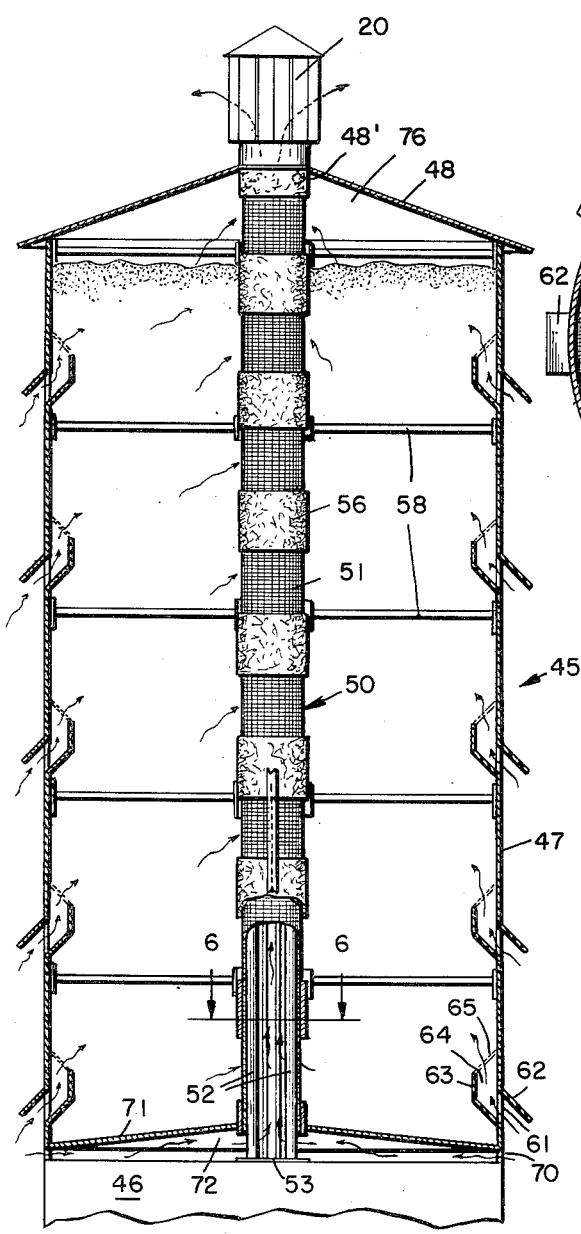
Fig. 4 is a central sectional view through a grain storage structure embodying another form of the invention.

More particularly describing the invention, referring first to Figs. 1 and 2, I show a grain storage structure, generally indicated by 11. I contemplate that this may be used for storing various kinds of grain, granular material or other material wherein it is necessary to guard against the stored material becoming damp. The structure 11 includes a foundation or base 12 which may be of any suitable material, such as concrete. Mounted on this in any conventional manner is a casing or outer wall 14 which is shown as circular. This supports a roof 15. The roof may either be removable as a whole from the wall 14 or it may have suitable hatches 16 to provide access to the interior. The roof preferably slopes downwardly from a central opening 17 to the edges thereof. The opening is defined by an upwardly extending wall or flange 18 upon which I mount an air circulating device 20. Preferably this device should be one which does not require a motor or any power-operated parts. While there are several such devices which can be used, I prefer to employ a device of the type disclosed in my United States Letters Patent No. 2,269,428, issued January 13, 1942. Such a device creates a suction or siphon effect when subjected to external air currents.

Within the wall or shell 14 and spaced therefrom I provide an inner wall 23 which is preferably formed of a foraminous or porous material, such as clay or a clay product. This inner wall 23 defines a storage space 24 to hold grain or other material. Suitable spacing brackets 26 are provided between wall 23 and the shell 14 as required for rigidity and strength.

Centrally of the structure I provide a vertically disposed conduit or stack 27 which also should be formed of a foraminous or porous material. The upper end of the stack is open and in communication with a head space 28 above the grain storage space or compartment 24. At the bottom of the conduit 27 I provide radially extending conduits or ducts 30 which are in open communication at their outer ends with the space 31 defined by the walls 14 and 23 and at their inner ends with the central conduit or stack 27 through the medium of openings 32 therein.

For the purpose of admitting air, I provide circumferentially spaced openings 33 around the shell 14 near the base 12, and these are preferably fitted with screens 35. Also, I provide a canopy or cover 36 for each opening.

With the construction described, it will be apparent that air will be drawn inwardly through the openings 33 of the shell 14 and from these openings upwardly through space 31 to the head space 28 and from there outwardly through the air circulating member 25. Also, air will circulate radially inwardly through the ducts 30 and upwardly through the central stack 27, the flow of air being indicated by the arrows on the drawing.

With the construction described, any moisture originally in the stored material, especially if the material is grain or granular in nature, migrates toward the inner stack 27 and the wall 23 and by capillary action passes through these porous walls to where it can be evaporated and carried away by the air circulating over the opposite sides of the walls. In this connection I have found that grain itself acts as an absorbent material with one grain absorbing moisture from another. As the grain next to any porous wall loses its moisture to the wall, it in turn absorbs moisture from adjacent grain particles so that moisture tends to be drawn from the body of the grain to the walls from which it is carried away by the circulating air.

In Fig. 3 I show a modified form of the structure of Fig. 1. In this form of the invention I provide vertical double walls 41 between the central stack 27a and the wall 23a which extend from the floor to the same height as wall 23a and stack 27a. The spaces 42 between the walls are open through wall 23a to the space 31a. This construction affords a greater area of porous wall exposed to the grain for absorbing moisture. The moisture absorbed by walls 41 is carried away by the circulation of air upwardly through the spaces 42.

Figure 5:
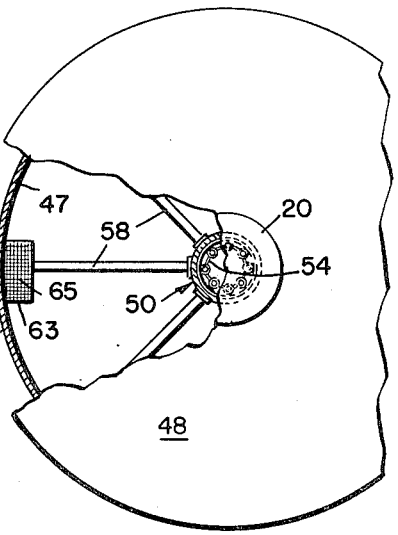
Fig. 5 is a fragmentary plan view, partially broken away, of the structure of Fig. 4.
Figure 6:
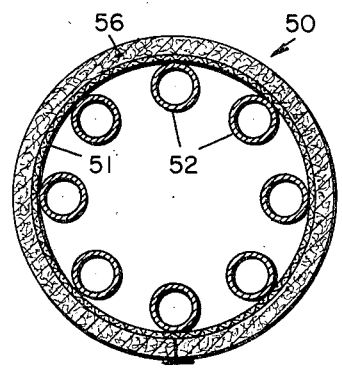
Fig. 6 is a sectional view on line 6—6 of Fig. 4 but on a larger scale.

Referring now to Figs. 4–6, I show another form of the invention in which a storage structure 45 is shown mounted on a foundation 46 of concrete or other desired material. The structure includes a shell 47 which may be of metal and a roof 48 of any impervious material. The roof has a central opening 48' in which I mount an air circulating device 20 which preferably is of the same type as the device previously described.

In this form of the invention I provide a centrally disposed stack or conduit 50 which is formed by a screen 51 secured about a plurality of circularly arranged vertical tubes 52. The tubes are anchored in a base member 53 and are held in spaced relation at the upper end of the structure by spacers 54.

I prefer to provide bands 56 of absorbent material such as felt, for example, about the central stack 50 at vertically spaced regions therealong. Materials other than felt could be used, however, as for example, clay or clay products. Also, as may be required for structural support, I provide a plurality of radially extending braces 58 at vertical intervals through the structure. These may be secured to the shell 47 and the stack 50 by conventional means.

In this form of the invention I provide a plurality of openings 61 in the shell 47 which are spaced vertically and circumferentially thereof. Outwardly the shell is provided with covers or canopies 62 to protect the openings. Inside the shell I provide a partition 63 at each opening to form a pocket 64. The pockets 64 are provided with screens 65 which extend between the upper part of the partition and the wall 47.

Also, I provide openings 70 in the shell beneath a floor 71. These communicate with space 72, and this in turn with the interior of the central stack 50. With this construction air induced by the air circulating member 20 passes upwardly through the stack 50. Also, moisture in the grain will be absorbed by the felt bands 56 from which the moisture will in turn be evaporated by the air flowing through the stack 50.

Also, air will tend to enter the openings 61 in the shell and pass through the body of the grain or other stored material tending to flow toward the spaces or portions of the stack 50 where the mesh or screen is exposed between bands 56 and will also tend to flow toward the head space 76 in the structure, thereby further contributing to moisture removal.

Figure 7:
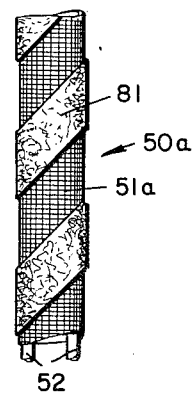
Fig. 7 is a fragmentary elevational view of a modified form of the structure shown in Figs. 4–6.

In Fig. 7 I show a fragmentary portion of a stack, indicated by 50a, which is in all respects similar to the stack 50 shown in Figs. 4–6 except that in this form of the invention I provide a helical wrapping 81 of absorbent material about the screen 51a. This form of the invention operates in the same way as the form shown in Figs. 4–6.

Figure 8:
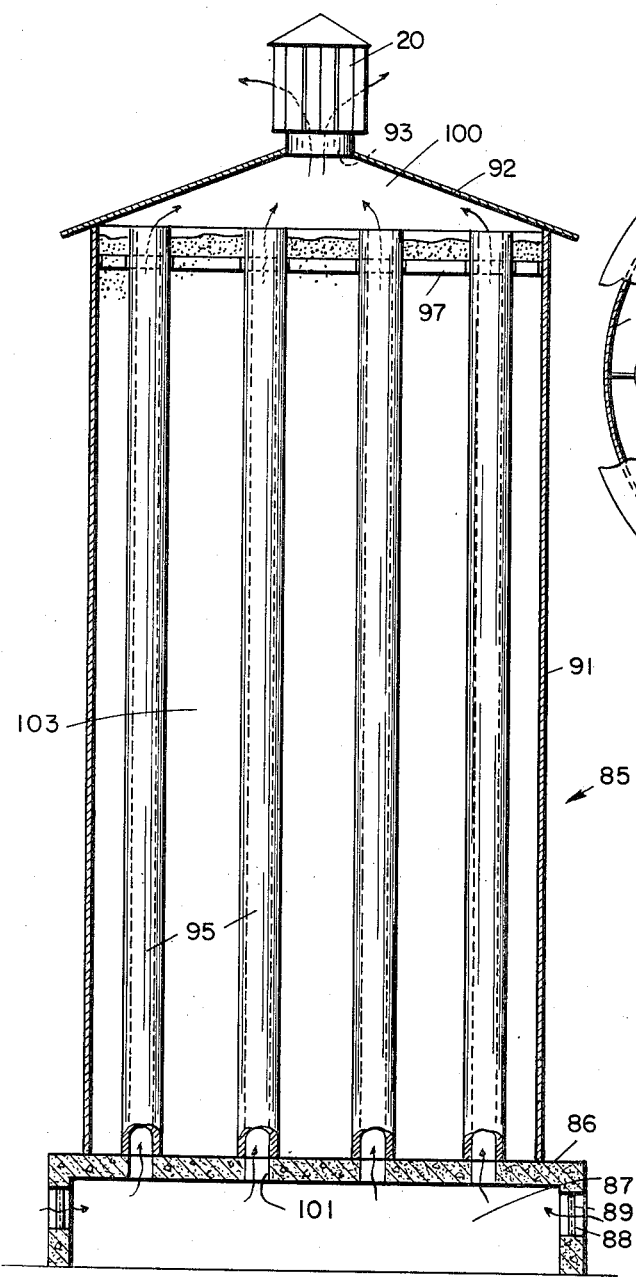
Fig. 8 is a sectional view of another form of grain storage structure.
Figure 9:
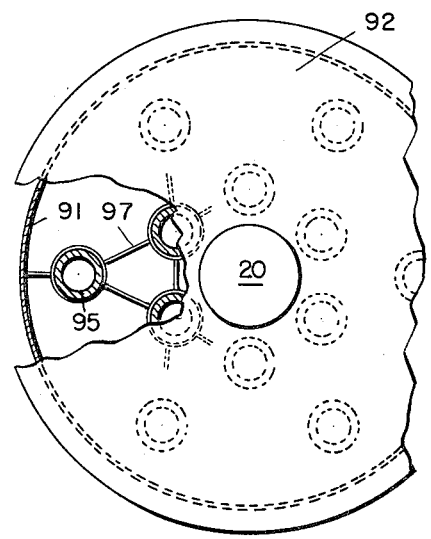
Fig. 9 is a fragmentary plan view, partly broken away, of the structure of Fig. 8.

In Figs. 8 and 9 I show another form of the invention, indicated generally by 85, which comprises a hollow base or foundation structure 86 which may be made of reinforced concrete or other desired material. This provides an air space 87 which is in communication with the exterior through circumferentially spaced openings 88 having screens 89 therein.

Mounted on the base 86 is a cylindrical shell 91 and upon this is a roof 92 similar to roof 47 previously described. This has a central opening 93 in which is mounted an air circulating device 20 of the type previously described.

In this form of the invention I provide a plurality of vertically extending laterally spaced clay pipes or tubes 95 within the shell 91. These tubes are mounted on the base 86 in any suitable way and are held in spaced relation near the top of the shell by a spacing structure, generally indicated by 97. The tubes 95 should be porous or foraminous in character. The tubes communicate with a head space 100 beneath the roof 92 and also, through the medium of openings 101 in the base 86, with the space 87 within the base or foundation structure.

In this form of the invention the space 103 between the tubes and beneath the roof within shell 91 is used for storage. It will be apparent that there will be a substantially continuous circulation of air through openings 88 in the base 86 into the space 87 and from here upwardly through tubes 95 to the head space 100 and then out through the air circulating device 20. The grain or other stored product will be thereby kept moisture-free as the moisture in the grain migrates toward the tubes 97 from which it is evaporated by the circulating air.

Although I have shown and described various forms of my invention, I do not intend to be limited thereby, since various other forms and modifications can be made without departing from the scope of the invention as set forth in the claims.

I claim:

1. In a storage structure for grain or the like, encasement means providing a storage chamber, a conduit extending through said chamber, said conduit having apertured walls, water-absorbent means disposed along said conduit and covering a portion of its area, means establishing communication between the ends of said conduit and the exterior of said chamber, and air circulation means operatively associated with said conduit.

2. A storage structure as set forth in claim 1 in which said apertured walls are screen and in which said water-absorbent means is felt-like.

3. A storage structure as set forth in claim 1 in which said encasement means is provided with screened openings at vertically spaced regions.

4. In a storage structure for grain or the like, encasement means providing a storage chamber, a base member, a plurality of circularly arranged columns extending through said chamber and anchored in said base member, screening wrapped around and secured to said columns forming a perforate ventilation tube, means providing communication between the ends of said tube and the exterior of said encasement means, and absorbent material covering a substantial portion of the area of said tube.

References Cited in the file of this patent

UNITED STATES PATENTS

| 87,568 | Johnson | Mar. 9, 1869 |
| 87,679 | Johnson | Mar. 9, 1869 |
| 470,607 | Vanderveer et al. | Mar. 8, 1892 |
| 764,237 | Hagner | July 5, 1904 |
| 1,303,945 | Nichols | May 20, 1919 |
| 1,660,555 | Gentslinger | Feb. 28, 1928 |
| 1,994,654 | Kreutzer | Mar. 19, 1935 |